No. 708,248. Patented Sept. 2, 1902.
F. ORLIKOWSKI.
METHOD OF MOLDING ARTIFICIAL STONE.
(Application filed May 14, 1902.)

(No Model.)

ATTEST
R. B. Moore
T. M. Madden

INVENTOR
Frank Orlikowski
By H. V. Fisher ATTY

UNITED STATES PATENT OFFICE.

FRANK ORLIKOWSKI, OF CLEVELAND, OHIO.

METHOD OF MOLDING ARTIFICIAL STONE.

SPECIFICATION forming part of Letters Patent No. 708,248, dated September 2, 1902.

Application filed May 14, 1902. Serial No. 107,264. (No specimens.)

*To all whom it may concern:*

Be it known that I, FRANK ORLIKOWSKI, a citizen of the United States, residing at Cleveland, in the county of Cuyahoga and State of Ohio, have invented certain new and useful Improvements in Methods of Molding Artificial Stone; and I do declare that the following is a full, clear, and exact description of the invention, which will enable others skilled in the art to which it appertains to make and use the same.

My invention relates to a method of molding artificial stone; and the invention comprises a new article of manufacture and the method of making the same, all substantially as shown and described, and particularly pointed out in the claim.

Figure 1:
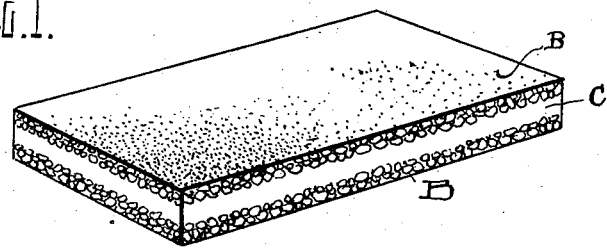
Figure 2:
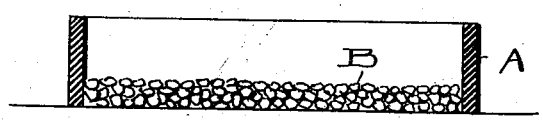
Figure 3:
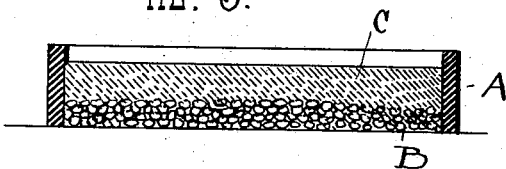
Figure 4:
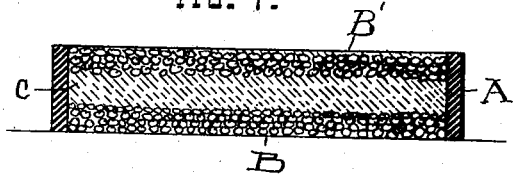

In the accompanying drawings, Figure 1 is a perspective view of the new stone made by my improved method. Fig. 2 is a sectional elevation of a flask in which the stone is manufactured, showing a layer or quantity of broken stone therein and representing the first step in the process. Figs. 3 and 4 are like views of the flask to Fig. 1 and showing successive steps in the process of manufacture. In Fig. 3 the work is ready for the next layer of stone, and in Fig. 4 this has been supplied and the stone presumably has been finished by the addition of cement and the final tamping.

The article thus produced and shown complete in Fig. 1 is designed to be used chiefly for street purposes—such as cross-walks, curbstones, and the like; but its greater value in street work is as a substitute for the expensive granite stones otherwise necessarily used for laying cross-walks. Now referring especially to the method of producing this new article, I employ a flask or mold A of any suitable size and shape, according to the form of stone to be made, and the said flask is open top and bottom and laid on a solid floor, paved or unpaved. Said flask is filled first with a layer of broken stones B, which may be any hard and serviceable stone like granite; but generally and preferably I take cobblestones, or what are known as "niggerheads" and which generally are found abundantly in cities as cast-aways from old paving and break them into pieces proportionately as large as a hen's egg or thereabout. Stone of this kind has the most durable wearing quality known, and by working it up into comparatively small pieces and packing the pieces firmly together in close layers at the surface of the stone I get a product practically equal in wearing quality and usefulness to the best solid granite stone, but very materially cheaper in cost. Now having placed a layer of stone pieces in flask A, I fill in upon the same a suitable quantity of cement mixture C of the consistency, say, of mortar as it is applied in plastering a wall. Possibly my cement is even somewhat thicker than this, but still it is adapted to flow sufficiently to be driven into the interstices of the stone pieces B under the heavy tamping I give and pack in with them as if they were originally mixed together. This done and thoroughly tamped, so as to make a firm and solid mass, it depends on the depth of the cement over the stones whether I then add more cement or place thereon the next layer of stone B', which comes in the top of the flask and may be described as also the top of the stone. Then having added this stone layer and the requisite cement and after tamping this down as firmly as two men can tamp the material the work of manufacture may be regarded as done, at least as far as all hand work is concerned. Then after the stone has hardened sufficiently the flask is removed and the stone is taken away. The cement mixture used by me in this manufacture consists of suitable quantities or proportions of Portland cement, cinder-slack dust, and cobblestone-dust. This mixture itself becomes exceedingly hard and firm and has excellent wearing quality, besides being a perfect binder for the stone. In this way I produce the stone seen in Fig. 1, which has the advantage of a practically all-stone wearing-surface on each side with a filling and body of cement which will endure for an indefinite period, and as one side of the stone becomes worn away, as of course it will in time, the stone can be reversed and a new side as good as the original be presented for service. Any equivalents of the cinder-slack and cobblestone-dust used in making the cement mixture may of course be employed in lieu of these ingredients. By cinder-slack I mean pulverized cinder of the kind found about rolling-mills and iron works, and cobblestone-dust is the finer sifting of the residue obtained in crushing cobblestones for my use. In such operation of crushing there is produced a considerable body of reduced material, and this I screen and take out the finer portions, while the larger mass can be further reduced in a special crusher, if needed. It is very heavy and becomes very solid with Portland cement. The solid packing quality of cinder-dust is likewise known.

What I claim is—

The method of making artificial stone consisting in placing within a suitable flask a compact layer of hard stone pieces; then covering said pieces at a suitable depth with a flowing cement, and then tamping the mass until solid; then spreading another close layer of hard stone pieces over said body to complete the stone and covering the same with cement to fill the interstices and overspread the same, and finally tamping the material thus added and leaving the stone with a flat finished top surface, substantially as described.

Witness my hand to the foregoing specification this 7th day of May, 1902.

FRANK ORLIKOWSKI.

Witnesses:
R. B. MOSER,
T. M. MADDEN.